(12) United States Patent
Noritake

(10) Patent No.: US 8,176,804 B2
(45) Date of Patent: May 15, 2012

(54) MOTOR ACTUATOR AND OPENING/CLOSING DEVICE

(75) Inventor: Seiichiro Noritake, Nagano (JP)

(73) Assignee: Nidec Sankyo Corporation (JP)

( * ) Notice: Subject to any disclaimer, the term of this patent is extended or adjusted under 35 U.S.C. 154(b) by 1239 days.

(21) Appl. No.: 10/588,618

(22) PCT Filed: Jan. 13, 2006

(86) PCT No.: PCT/JP2006/300376
§ 371 (c)(1),
(2), (4) Date: Aug. 7, 2006

(87) PCT Pub. No.: WO2006/075704
PCT Pub. Date: Jul. 20, 2006

(65) Prior Publication Data
US 2008/0257086 A1    Oct. 23, 2008

(30) Foreign Application Priority Data

Jan. 14, 2005 (JP) .................................. 2005-008286

(51) Int. Cl.
*F16H 19/04* (2006.01)
*F03G 3/00* (2006.01)
(52) U.S. Cl. ............................................ 74/32; 74/84 R
(58) Field of Classification Search ................. 74/32, 29, 74/30, 31, 33, 84 R, 130, 132, 133
See application file for complete search history.

(56) References Cited

U.S. PATENT DOCUMENTS

| 654,153 | A | * | 7/1900 | Herod et al. | 74/30 |
| 1,703,497 | A | * | 2/1929 | Noah | 74/32 |
| 1,898,956 | A | * | 2/1933 | Harvie | 83/629 |
| 2,385,457 | A | * | 9/1945 | Morgan | 74/132 |
| 5,655,404 | A | * | 8/1997 | Tsepenuk | 74/30 |
| 6,283,392 | B1 | * | 9/2001 | Stiner | 242/241 |
| 6,789,439 | B2 | * | 9/2004 | Tung | 74/32 |

FOREIGN PATENT DOCUMENTS

| JP | 2-69155 | 5/1990 |
| JP | 3-63784 | 6/1991 |
| JP | 6-109354 | 4/1994 |
| JP | 2000-320955 | 11/2000 |

* cited by examiner

*Primary Examiner* — Thomas R Hannon
*Assistant Examiner* — Alan Waits
(74) *Attorney, Agent, or Firm* — Cantor Colburn LLP

(57) ABSTRACT

In a driving force transmission mechanism in a motor type damper device, when a small AC synchronous motor rotates in one direction and a tooth-missing gear part of a tooth-missing gear engages with the first rack part of a rack member the rack member is moved upward to operate a baffle in an open direction and, when the tooth-missing gear part engages with the second rack part of the rack member, the rack member is moved downward to operate the baffle in a close direction. In this manner, even when the baffle and the rack member are operated in both directions, the tooth-missing gear is required to be rotated in only one direction and the rotation of the small AC synchronous motor is not required to be reversed. Therefore, the structure of a control circuit for the motor type damper device can be simplified.

9 Claims, 5 Drawing Sheets

[Fig.1]
(A)
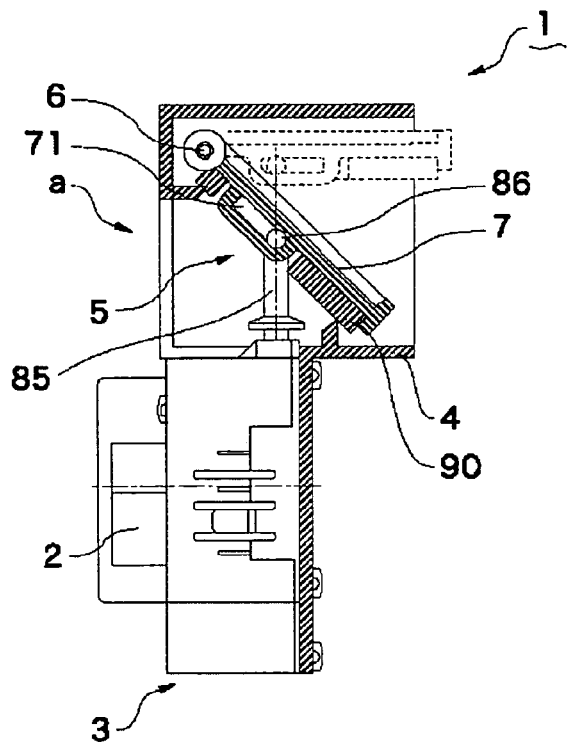
(B)
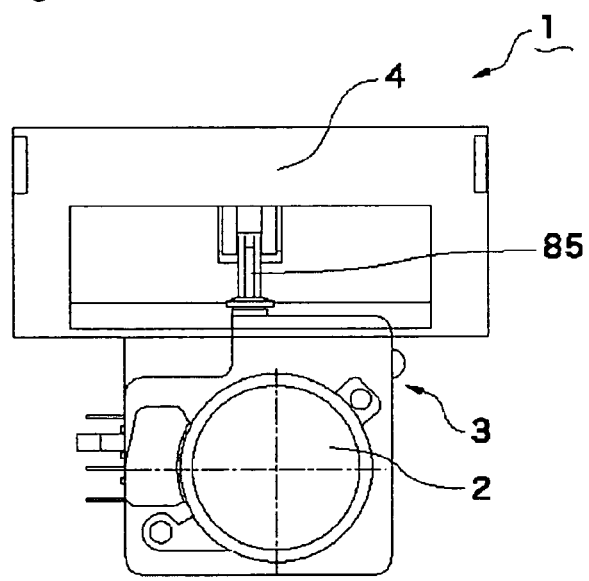

[Fig.2]
(A)
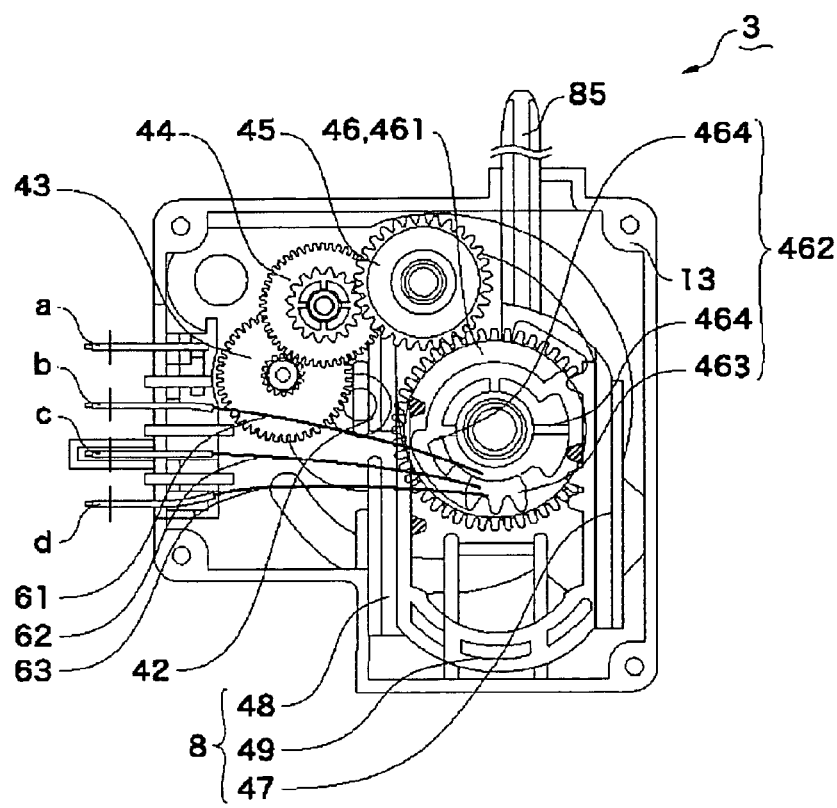
(B)
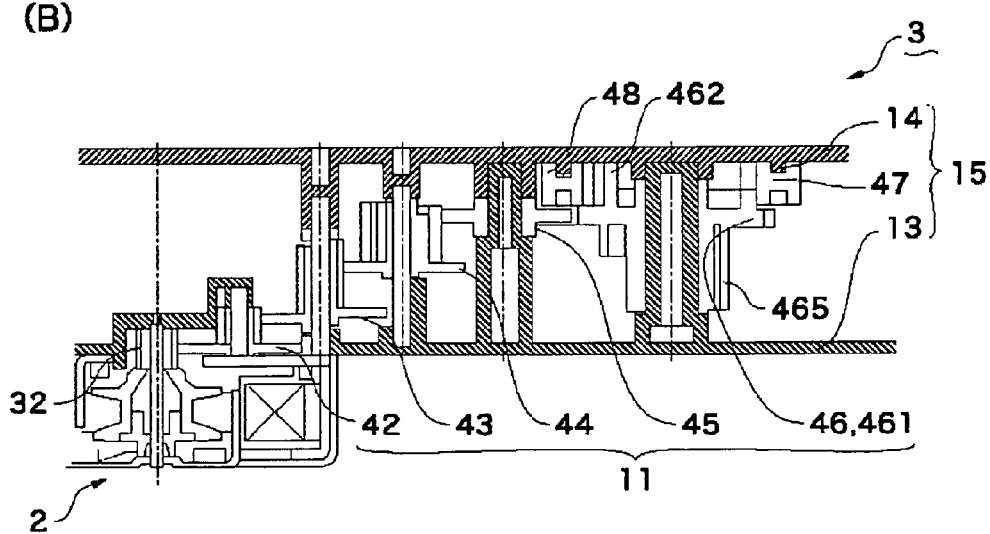

[Fig.3]
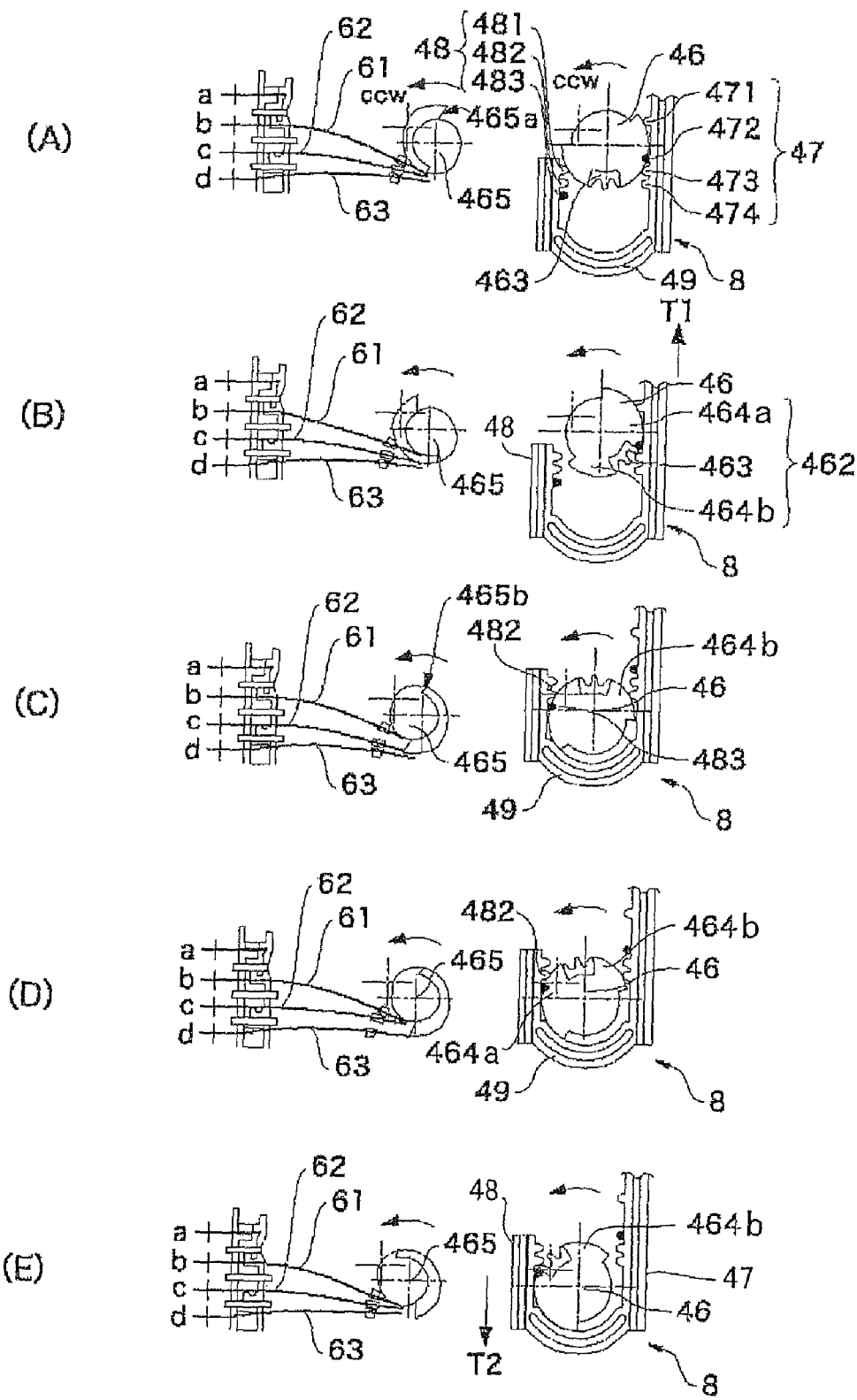

[Fig.4]
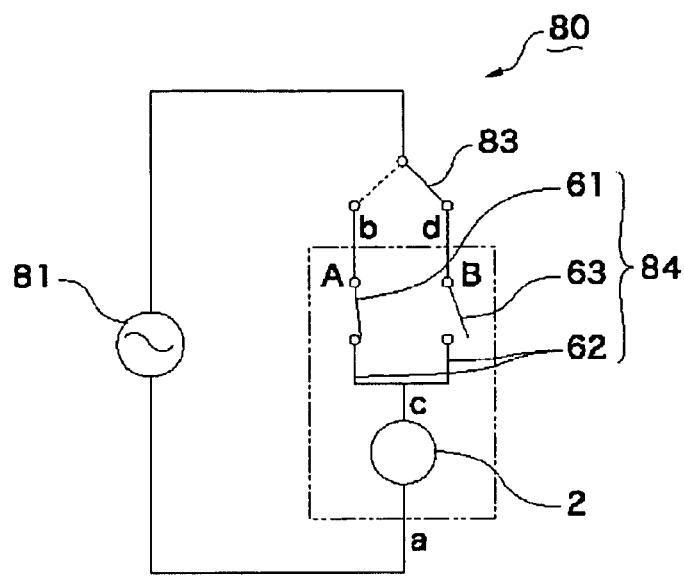
[Fig.5]
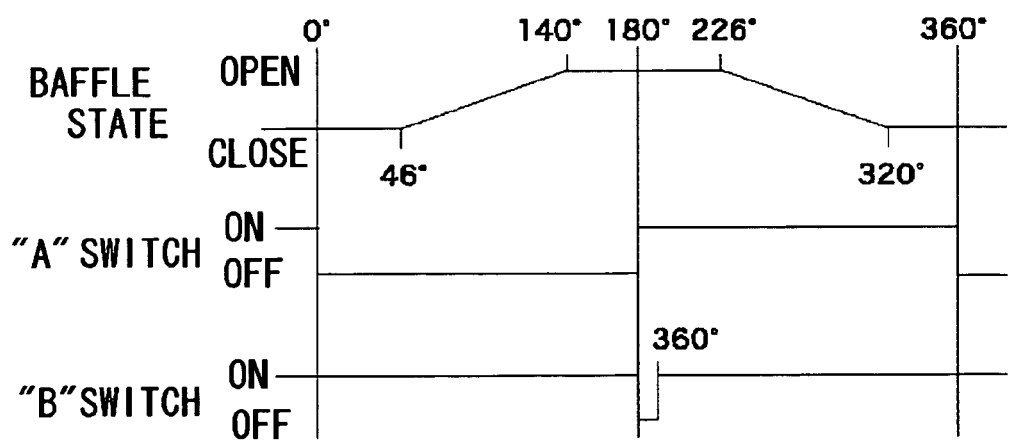

[Fig.6]
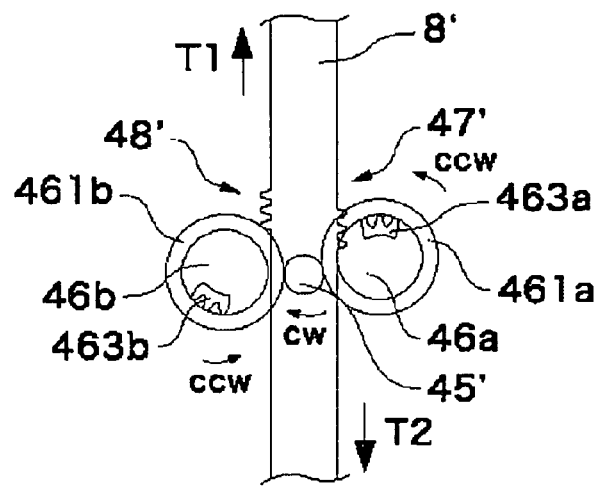
[Fig.7]
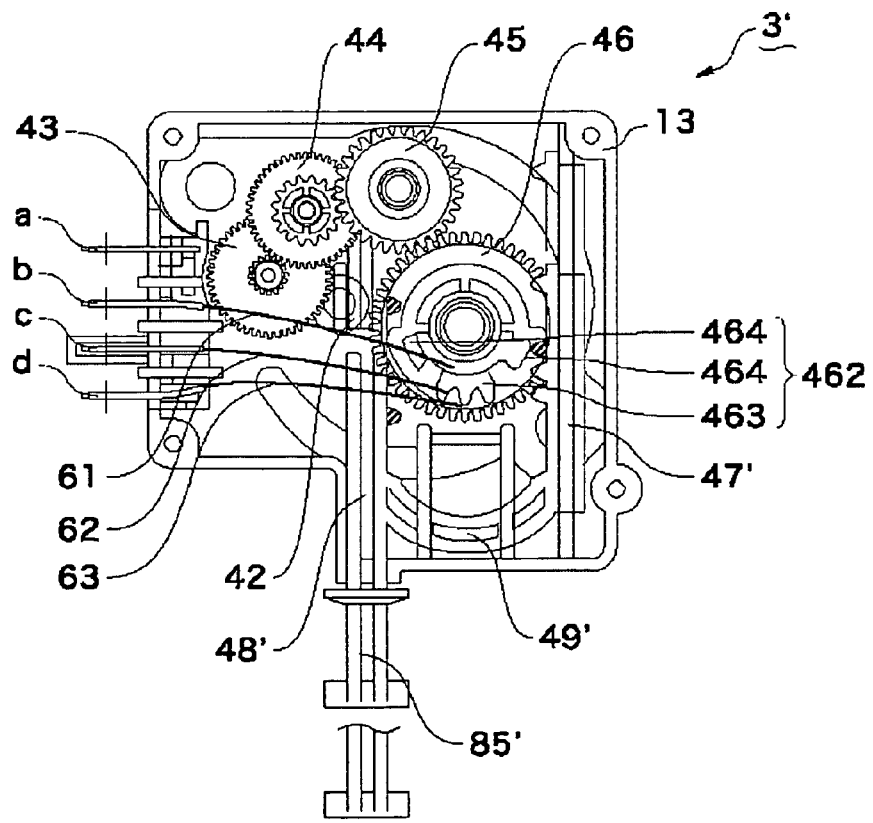

MOTOR ACTUATOR AND OPENING/CLOSING DEVICE

This is a U.S. national stage of application No. PCT/JP2006/300376, filed on 13 Jan. 2006. Priority under 35 U.S.C. §119(a) and 35 U.S.C. §365(b) is claimed from Japanese Application No. JP 2005-8286, filed 14 Jan. 2005, the disclosure of which is also incorporated herein by reference.

FIELD OF THE INVENTION

The present invention relates to a motor actuator with which a driving force of a motor is transmitted to a driven member through a driving force transmission mechanism for operating the driven member and relates to an opening/closing device for operating an opening/closing member which is used in a refrigerator or the like.

BACKGROUND ART

Conventionally, for example, a motor type damper device for controlling the taking of cold air in a refrigerator has been known as a motor unit (motor actuator) in which a motor such as an AC synchronous motor or a stepping motor is used as a drive source (see, for example, Japanese Patent Laid-Open No. Hei 6-109354).

In the case of the motor type damper device which is disclosed in the above-mentioned Japanese Patent Laid-Open No. Hei 6-109354, a baffle and a drive mechanism part such as a motor are disposed across a rotary fulcrum shaft. When the motor is rotated in one direction to move a rack upward, an engaging shaft abuts with an upper face of a hollow portion to turn the baffle in an open direction and thus an intake opening for cold air is opened. Further, when the motor is rotated in the other direction, a lower portion of the engaging shaft abuts with the elastic piece of an elastic plate and depresses it downward to turn the baffle in a close direction.

DISCLOSURE OF THE INVENTION

However, in the case of the damper device described in Japanese Patent Laid-Open No. Hei 6-109354, opening/closing of the baffle is performed by means of that the motor is forwardly and reversely rotated to move the engaging shaft up and down and thus the structure of a control circuit for changing the rotating direction of the motor becomes complicated.

In view of the problems described above, the present invention may provide a motor actuator in which the rotation of a motor is not required to be reversed even when a driven member is operated in both directions. Further, another object of the present invention is to provide an opening/closing device in which the rotation of a motor is not required to be reversed when an opening/closing member is performed in an opening and a closing operations.

Thus, there may be provided a motor actuator in which a driving force by a motor is transmitted to a driven member through a driving force transmission mechanism to operate the driven member, characterized in that, the driving force transmission mechanism comprises a gear which is rotationally driven by the motor and a rack member which is linearly driven by the gear to operate the driven member, and the gear is provided with a tooth-missing gear part in which a teeth part is formed at a predetermined position in a circumferential direction of the gear, and the rack member is provided with a first rack part which causes the rack member to move in one direction when the motor rotates in one direction and the first rack part engages with the tooth-missing gear part and a second rack part which causes the rack member to move in the other direction when the motor rotates in the above-mentioned one direction and the second rack part engages with the tooth-missing gear part.

In a motor actuator, when the motor in the driving force transmission mechanism rotates in one direction and the tooth-missing gear part engages with the first rack part of the rack member, the rack member may be moved in one direction to operate the driven member in a predetermined direction, and when the tooth-missing gear part engages with the second rack part of the rack member, the rack member is moved in the other direction to operate the driven member in an opposite direction. As described above, even when the driven member is operated in both directions, the gear is required to be turned in only one direction and the rotation of the motor is not required to be reversed and thus the structure of a control circuit of the motor actuator can be simplified.

Thus, it is preferable that the tooth-missing gear part is in a non-engagement state with the second rack part when the tooth-missing gear part engages with the first rack part, and the tooth-missing gear part is in a non-engagement state with the first rack part when the tooth-missing gear part engages with the second rack part. According to the structure as described above, when the tooth-missing gear part engages with the first rack part to move the rack member in one direction, since the tooth-missing gear part does not engage with the second rack part, the rack member does not receive unnecessary force between the second rack part and the tooth-missing gear part. On the other hand, when the tooth-missing gear part engages with the second rack part to move the rack member in the other direction, since the tooth-missing gear part does not engage with the first rack part, the rack member does not receive unnecessary force between the first rack part and the tooth-missing gear part.

Thus, it is preferable that the first rack part and the second rack part are extended in parallel to each other. According to the structure as described above, the rack member can be reciprocated only in the direction where the first rack part and the second rack part are extended and thus operating space of the rack member can be narrowed. Accordingly, the size of the motor actuator can be reduced.

Thus, it is also preferable that the rack member is provided with a pair of inner side portions between which the gear is disposed and which are extended in parallel to each other, and the first rack part is formed in one of a pair of the inner side portions and the second rack part is formed in the other of a pair of the inner side portions. According to the structure as described above, the rack member can be driven in both directions with only one gear and thus the number of components and space can be reduced. Further, since the first rack part and the second rack part are extended in parallel to each other, the rack member can be reciprocated only in the direction in which the first rack part and the second rack part are extended. Therefore, since operating space of the rack member may be narrowed, the size of the motor actuator can be reduced.

Thus, it may be structured that the driving force transmission mechanism includes, as the gear, a first gear on one side of both side positions of the rack member and a second gear on the other side of the both side positions, and the rack member is provided with a pair of outer side portions which respectively face on opposite sides and are extended in parallel to each other, and the first rack part is formed in one of a pair of the outer side portions and the second rack part is formed in the other of a pair of the outer side portions. According to the structure as described above, since the rack member can be reciprocated only in the direction in which the first rack part and the second rack part are extended, operating space of the rack member may be narrowed. Therefore, the size of the motor actuator can be reduced.

The motor actuator to which the present invention is applied can be used, for example, in an opening/closing device. In this case, the driven member is an opening/closing member whose position is changed to an open position or a close position by the rack member.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 (A) is a partly sectional view showing an opening/closing device and (B) is a rear view showing the opening/closing device which is viewed from the direction of "a".

FIG. 2 (A) is a plan view showing a geared motor which is used in the opening/closing device shown in FIG. 1 and (B) is a developed view showing a gear train of the geared motor.

FIGS. 3 (A), (B), (C), (D) and (E) are explanatory views showing operations of the opening/closing device shown in FIG. 1.

FIG. 4 a block diagram showing a control circuit of a refrigerator on which the opening/closing device shown in FIG. 1 is mounted.

FIG. 5 a timing chart showing operations of a baffle and switches in the opening/closing device shown in FIG. 1.

FIG. 6 an explanatory view showing another opening/closing device to which the present invention is applied.

FIG. 7 a plan view showing another opening/closing device.

EXPLANATION OF REFERENCE NUMERALS 1 motor type damper device (opening/closing device)
2 small AC synchronous motor
3 driving force transmission mechanism
7 baffle
8 rack member
46 tooth-missing gear (gear)
461 gear part
462 tooth-missing gear part
463 teeth part
47 first rack part
48 second rack part
49 connecting part

BEST MODE FOR CARRYING OUT THE INVENTION

As a motor actuator to which the present invention is applied, an opening/closing device for causing a baffle (driven member) used in a refrigerator to perform opening or closing operation will be described below with reference to the accompanying drawings.

(Entire Structure of Opening/Closing Device)

FIG. 1(A) is a partly sectional explanatory view showing an opening/closing device to which the present invention is applied and FIG. 1(B) is a rear view showing the opening/closing device which is viewed from the direction of "a" in FIG. 1(A). FIG. 2(A) is a plan view showing a geared motor which is used in the opening/closing device shown in FIG. 1 and FIG. 2(B) is a developed view showing a gear train of the geared motor. FIGS. 3(A), 3(B), 3(C), 3(D) and 3(E) are explanatory views for explaining the structure and operation of the opening/closing device shown in FIG. 1. The left side views show positional relationships between a cam member and contact pieces which are viewed from the same direction as FIG. 2(A) and the right side views show positional relationships between a rack member and a tooth-missing gear which are viewed from the same direction as FIG. 2(A).

The opening/closing device shown in FIGS. 1(A) and 1(B) and FIGS. 2(A) and 2(B) is a kind of motor unit. Specifically, the opening/closing device is a motor type damper device 1 for cutting off cold air that is driven by a small AC synchronous motor in a refrigerator.

The motor type damper device 1 includes a small AC synchronous motor 2 as a motor and a driving force transmission mechanism 3 for transmitting a driving force of the small AC synchronous motor 2. A geared motor (motor actuator) is structured with the small AC synchronous motor 2 and the driving force transmission mechanism 3.

As shown in FIGS. 1(A) and 1(B), the motor type damper device 1 includes a pipe-shaped frame 4 whose both ends are opened, an opening part 5 which is formed in the inside of the frame 4, and a baffle 7 as an opening/closing member (driven member) which turns about a fulcrum shaft 6 to perform opening and closing operation of the opening part 5. The opening part 5 is opened or closed by using the baffle 7 to control supply of cold air to a chamber. In a connecting portion which is formed on an underside of the baffle 7 in the motor type damper device 1, a hollow part 71 is formed at an eccentric position to the fulcrum shaft 6. A protruded part 86 which is protruded in a side direction at the tip end of an output part 85 of a rack member 8 of the driving force transmission mechanism 3 is inserted into the hollow part 71. A sheet 90 comprised of polyethylene foam which is an elastic body is provided on the rear face of the baffle 7 which is located on the side of the opening part 5 to fully close the opening part 5 when the baffle 7 is closed.

As shown in FIGS. 2(A) and 2(B), the driving force transmission mechanism 3 includes a gear train part 11 mechanically connected to the small AC synchronous motor 2, a cam part 465 formed in a gear (tooth-missing gear 46 which is a gear having a tooth-missing gear) of the last stage of the gear train part 11 and the rack member 8. The driving force transmission mechanism 3 is disposed in the inside of a case body 15. The case body 15 is structured by means of that a lower case 13 and an upper case 14 are fixed to each other with screws. The small AC synchronous motor 2 is commonly used and thus its detail description is omitted.

The gear train part 11 includes a first gear 42 which engages with a pinion 32 fixed to an output shaft of the small AC synchronous motor 2, a second gear 43 which engages with a pinion portion of the first gear 42, a third gear 44 which engages with a pinion portion of the second gear 43, a fourth gear 45 which engages with a pinion portion of the third gear 44, and a tooth-missing gear 46 (gear) as a fifth gear which is provided with a gear part 461 engaging with the fourth gear 45. The gear part 461 of the tooth-missing gear 46 is formed with teeth around the entire circumference.

As shown in FIGS. 2(A), 2(B) and 3(A), the rack member 8 includes a pair of rack parts 47 and 48 and a connecting part 49 which connects both end portions of a pair of the rack parts 47 and 48. A pair of the rack parts 47 and 48 is disposed in parallel to each other in a radial direction of the tooth-missing gear 46. In other words, the rack member 8 is a plate-like member which is provided with a pair of opposite parts which face each other so as to interpose the tooth-missing gear 46 therebetween and the connecting part 49 which connects both end portions of the opposite parts. A pair of the opposite parts is provided with a first rack part 47 that is formed in one of inner side portions extended in parallel to each other in the opposite parts and a second rack part 48 that is formed in the other of the inner side portions. An output part 85 protruding from an upper portion of the case body 15 is formed at an end portion on an opposite side to the portion where the connecting part 49 is located in the first rack part 47. As further seen in FIG. 2(A), an other end portion of the first rack part 47 and an other end portion of the second rack part 48 are separated from each other so as to form a separated space between the other end portions of the first rack part 47 and the second rack part 48. FIG. 2(A) further shows that a gear 45 can be engaged with the gear part 461 of the tooth-missing gear 46 through the separated space.

Four tooth parts 471, 472, 473 and 474 are formed in the first rack part 47. The thickness of the second tooth part 472 is formed thinner than those of other three tooth parts 471, 473 and 474. Three tooth parts 481, 482 and 483 are formed in the second rack part 48. The thickness of the third tooth part 483 is formed thinner than those of other two tooth parts 481 and 482.

As shown in FIG. 2(B), the tooth-missing gear 46 is formed with a tooth-missing gear part 462 on an upper side in the axial direction of a gear part 461, and a cam part 465 which is described below in detail is integrally formed on its underside so as to overlap on the gear part 461. In the tooth-missing gear 46, the tooth-missing gear part 462 is formed over an angular range of about 230 degrees in an outer periphery of the tooth-missing gear 46, and a teeth part 463 comprised of three teeth is formed at the center portion in a circumferential direction of the tooth-missing gear part 462 over an angular range of about 56 degrees. Further, both side areas in the circumferential direction of the teeth part 463 of the tooth-missing gear part 462 are formed in thin plate parts 464a, 464b whose outer circumferential edge portion is formed in a circular arc shape. The thickness of the thin plate parts 464a, 464b is set to be about half of the thickness of the teeth part 463 and thus the thin plate parts 464a, 464b are capable of overlapping in the axial direction with the second thin tooth part 472 of the rack part 47 and the third thin tooth part 483 of the rack part 48. In this embodiment, as described below, the cam part 465 causes contact pieces to operate which structure switches for the small AC synchronous motor 2.

(Structure of Control Circuit)

FIG. 4 is a circuit diagram showing a control circuit of a refrigerator on which the opening/closing device shown in FIG. 1 is mounted. In FIG. 4, in a control circuit 80 used in a real refrigerator, a compressor, a thermostatic switch for on/off operation of the compressor, a fan motor, a switch for the fan motor and the like are required. However, these structures are omitted in FIG. 4 and only a motor drive circuit for opening or closing the baffle 7 is shown in the control circuit 80 of a refrigerator. Specifically, the control circuit 80 includes three elements, i.e., a temperature sensor 83 which is serially-connected with an AC power supply 81, a switch part 84 which is comprised of a first contact piece 61, a second contact piece 62 and a third contact piece 63 and is operated by the cam part 465 shown in FIGS. 3(A) and 3(C), and the small AC synchronous motor 2.

In accordance with this embodiment, in order to structure the switch part 84, as shown in FIGS. 3(A) and 3(C), the cam part 465 of the tooth-missing gear 46 is formed with two step parts 465a, 465b which are recessed in the radial direction. Further, a first wire spring-shaped contact piece 61 is provided for falling in two step parts 465a, 465b of the cam part 465, a second wire spring-shaped contact piece 62 is provided for falling in only the step part 465a, and a third wire spring-shaped contact piece 63 is provided for contacting with and separating from the second contact piece 62. The first contact piece 61 is formed to be the terminal "b" shown in FIG. 4, the second contact piece 62 is formed to be the terminal "c" shown in FIG. 4, and the third contact piece 63 is formed to be the terminal "d" shown in FIG. 4. The cam part 465 is rotated with rotation of the tooth-missing gear 46 and three contact pieces 61, 62 and 63 are contacted with and separated from with the rotation of the cam part 465 to change a connecting state between the terminal "c" and the terminals "b" and "d". In the following description, a switch formed with the first contact piece 61 and the second contact piece 62 in the switch part 84 is set to be an "A" switch and a switch formed with the third contact piece 63 and the second contact piece 62 is set to be a "B" switch. In accordance with this embodiment, in the control circuit 8, an end of a magnet wire of the small AC synchronous motor is connected to the terminal "c" and the other end is connected to the terminal "a".

The temperature sensor 83 is a thermostatic switch and, when a temperature in a chamber of a refrigerator becomes a predetermined temperature, e.g., 2° C. or lower, a terminal to be connected switches to the terminal "b" from the terminal "d". Further, when the temperature of the chamber in the refrigerator becomes a predetermined temperature, e.g., 5° C. or higher, the terminal that is connected by the temperature sensor 83 is switched to the terminal "d" from the terminal "b".

(Operation)

An operation of the motor type damper device 1 in accordance with this embodiment will be described with reference to FIGS. 3, 4 and 5. FIG. 5 is a timing chart showing operations of a baffle and switches in the opening/closing device shown in FIG. 1.

First, the position of the baffle 7 shown by the solid line in FIG. 1 is set to be a fully closed stop position where the baffle 7 completely closes the opening part 5. The positional relationship between the cam part 465 and the respective contact pieces 61, 62 and 63 and the positional relationship between the rack member 8 and the tooth-missing gear 46 in this state are shown in FIG. 3(A). In this case, the tooth-missing gear 46 is at the position of zero degree in the timing chart diagram shown in FIG. 5 and, in the control circuit 80 shown in FIG. 4, the "A" switch in the switch part 84 is turned on (the first contact piece 61 and the second contact piece 62 are in an "on" state) and the "B" switch is turned on (the third contact piece 63 and the second contact piece 62 are in an "on" state). Further, the temperature sensor 83 is connected with the terminal "b". In other words, this state is a midway state where the baffle 7 is closing, for example, when the temperature in the chamber becomes a predetermined temperature, e.g., 2° C. or lower, and the state just before the small AC synchronous motor 2 is stopped.

Next, at the time point when the turning of the tooth-missing gear 46 passes zero degree, the first contact piece 61 which has abutted with the cam part 465 falls in the step part 465b to be separated from the second contact piece 62. Therefore, the "A" switch of the control circuit 80 is turned off and the small AC synchronous motor 2 is stopped. On the other hand, since the third contact piece 63 is maintained to be in contact with the second contact piece 62, the "B" switch is maintained in an "on" state.

As shown in FIG. 3(A), when the baffle 7 is in a fully closed state, the thin plate part 464a of the tooth-missing gear 46 is engaged with the first tooth part 471 and the third tooth part 473 of the first rack part 47 as a move preventing part and thus movement of the rack member 8 is prevented. In this case, the second tooth part 472 of the first rack part 47 overlaps the thin plate part 464a in the axial direction.

While the small AC synchronous motor 2 stops in the above-mentioned state, the baffle 7 is continued in a closed state. Therefore, since cold air is not introduced to the chamber of the refrigerator, temperature in the chamber rises. When temperature in the chamber rises a predetermined temperature, e.g., 5° C. or higher, the connection of the temperature sensor 83 is switched to the terminal "d" from the terminal "b". In this case, since the "B" switch is in an "on" state, electric power is supplied to the small AC synchronous motor 2 again by this switching to start driving.

When the small AC synchronous motor 2 starts to rotate in one direction, its rotation is transmitted to the gear part 461 of the tooth-missing gear 46 via a pinion 32, a first gear 42, a second gear 43, a third gear 44 and a fourth gear 45. Therefore, the tooth-missing gear 46 turns in the CCW direction (counterclockwise direction) shown by the arrow in FIG. 3(A) and thus the cam part 465 also turns in the CCW direction (counterclockwise direction) shown by the arrow.

Then, as shown in FIG. 3(B), when the tooth part 463 of the tooth-missing gear part 462 of the tooth-missing gear 46 begins to engage with the first rack part 47, the rack member 8 is linearly driven in a direction shown by the arrow "T1" in FIG. 3(B) and the baffle 7 begins to turn in an open direction.

When the rack member 8 is linearly driven in the direction shown by the arrow "T1" as described above, the second rack part 48 does not engage with any portion of the tooth-missing gear part 462. In other words, the second rack part 48 engages with neither of the tooth part 463 and the thin plate parts 464a and 464b and thus the tooth-missing gear part 462 is in an non-engagement state with the second rack part 48. Therefore, the movement of the rack member 8 is permitted and the rack member 8 is smoothly and linearly driven in the "T1" direction.

When turning of the tooth-missing gear 46 continues and the tooth-missing gear 46 is turned by 180 degrees, as shown in FIG. 3(C), the tooth-missing gear part 462 is completely separated from both the first rack part 47 and the second rack part 48. At this point, the baffle 7 turns by 45 degrees from the fully closed state and moves to a full open position shown by the dotted line in FIG. 1. When the baffle 7 is in the fully opened state, the thin plate part 464a of the tooth-missing gear 46 engages with the second tooth part 482 of the second rack part 48 and the inner peripheral face of the connecting part 49 to prevent the movement of the rack member 8. In this case, the third tooth part 483 of the second rack part 48 overlaps the thin plate part 464a in the axial direction.

At the time point when the turning of the tooth-missing gear 46 passes through the point of 180 degrees, the second contact piece 62 which has abutted with the cam part 465 falls in the step part 465a to be separated from the third contact piece 63. Therefore, since the "B" switch of the control circuit 80 is turned off, the small AC synchronous motor 2 stops. In this case, the first contact piece 61 comes into contact with the second contact piece 62 to be turned in an ON state and thus the "A" switch is turned in an ON state.

While the small AC synchronous motor 2 has stopped in the above-mentioned state, the baffle 7 is maintained in the open state. Therefore, temperature in the chamber is dropped by introduction of cold air to the chamber of the refrigerator. After that, when the temperature in the chamber falls to a predetermined temperature, e.g., 2° C. or lower, the terminal which is connected by the temperature sensor 83 is switched to the terminal "b" from the terminal "d". At this time point, since the "A" switch is in an ON state, electric power is supplied to the small AC synchronous motor 2 again to start driving in accordance with this switching.

When the small AC synchronous motor 2 starts to rotate in one direction again, the tooth-missing gear 46 starts to turn again in the CCW direction shown by the arrow. FIG. 3(D) shows the state where the tooth-missing gear 46 is turned by 191 degrees and, at the time point when the turning has passed 191 degrees, the "B" switch of the switch part 84 is turned on (the second contact piece 62 and the third contact piece 63 are turned to be ON). When its turning angle becomes 226 degrees, as shown in FIG. 3(E), the teeth part 463 of the tooth-missing gear part 462 begins to engage with the second rack part 48. When the tooth-missing gear part 462 and the second rack part 48 are engaged with each other, the rack member 8 is begun to be linearly driven in a direction shown by the arrow "T2" in FIG. 3(E) and the baffle 7 begins to turn in the close direction.

While the second rack part 48 is linearly driven in the direction shown by the arrow "T2", the first rack part 47 does not engage with any portion of the tooth-missing gear part 462. In other words, the first rack part 47 does not engage with the teeth part 463 and the thin plate parts 464a and 464b and thus the tooth-missing gear part 462 is in a non-engagement state with the first rack part 47. Therefore, movement of the rack member 8 is permitted and the rack member 8 is smoothly and linearly moved in the T2 direction.

When the turning angle of the tooth-missing gear 46 becomes 320 degrees, the baffle 7 becomes in a fully closed state. Further, the "A" switch of the control circuit 80 is continued to be in an "ON" state and both the "A" switch and the "B" switch are continued to be in an "ON" state.

When the tooth-missing gear 46 turns once (360 degrees), the "A" switch is turned to be off and rotation of the small AC synchronous motor 2 stops. As a result, the baffle 7 continues to be in a fully closed state until temperature in the chamber rises to 5° C. or higher.

The chamber of a refrigerator is maintained in a specified temperature range by repeating the above-mentioned operation.

PRINCIPAL EFFECTS OF THIS EMBODIMENT

As described above, in the driving force transmission mechanism 3 in the motor type damper device 1 in accordance with this embodiment, when the small AC synchronous motor 2 rotates in one direction and the tooth-missing gear part 462 of the tooth-missing gear 46 engages with the first rack part 47 of the rack member 8, the rack member 8 is moved upward and the baffle 7 is operated in the open direction and, when the tooth-missing gear part 462 engages with the second rack part 48 of the rack member 8, the rack member 8 is moved downward and the baffle 7 is operated in the close direction. As described above, even when the baffle 7 is operated in both directions, the tooth-missing gear 46 is only required to be turned in a counterclockwise direction as shown by the arrow "CCW" and rotation of the small AC synchronous motor 2 is not required to be reversed, and thus the structure of the control circuit 80 for the motor type damper device 1 can be simplified.

Further, the rack member 8 is a plate-like member which is provided with a pair of the opposite parts that face each other across the tooth-missing gear 46 and the connecting part 49 that connects the end portions of the opposite parts. Further, the first rack part 47 and the second rack part 48 are respectively formed on a pair of the inner side portions which are extended in a parallel manner in the opposite parts. In other words, the rack parts 47 and 48 are disposed in parallel each other in the radial direction of the tooth-missing gear 46. The rack part 47 engages with the teeth part 463 on one side in the radial direction of the tooth-missing gear 46 and the rack part 48 engages with the teeth part 463 on the other side in the radial direction. Therefore, the rack member 8 can be driven in both directions only with the tooth-missing gear 46 and thus reduction of number of components and space saving can be attained. Further, since the first rack part 47 and the second rack part 48 are extended so as to be parallel to each other, the rack member 8 can be reciprocated only in the extending direction of the first rack part 47 and the second rack part 48. Therefore, since operating space of the rack member 8 may be narrowed, the size of the motor type damper device 1 can be reduced.

Further, when the teeth part 463 engages with the first rack part 47 to drive the rack member 8, the teeth part 463 does not engage with the second rack part 48. Therefore, the rack member 8 does not receive unnecessary force between the second rack part 48 and the tooth-missing gear part 462. Similarly, when the teeth part 463 engages with the second rack part 48 to drive the rack member 8, the teeth part 463 does not engage with the first rack part 47. Therefore, the rack member 8 does not receive unnecessary force between the first rack part 47 and the tooth-missing gear part 462. Accordingly, the rack member 8 can be efficiently and smoothly driven.

Other Embodiments

The present invention has been described in detail using the embodiments, but the present invention is not limited to the embodiments described above and many modifications can be made without departing from the present invention.

For example, in the embodiment described above, the U-shaped rack member 8 is used in which two rack parts 47 and 48 are disposed in parallel to each other in the radial direction of the tooth-missing gear 46. However, for example, as shown in FIG. 6, a straight-shaped rack member 8' may be used in which two rack parts 47' and 48' are formed in portions on each other's back face side.

In other words, a driving force transmission mechanism is provided as a gear with a first tooth-missing gear 46a on one side of both sides of the rack member 8' and a second tooth-missing gear 46b on the other side. Teeth parts 461a and 461b of two tooth-missing gears 46a and 46b engage with an intermediate gear 45' and rotation of a motor (not shown) is transmitted to the teeth parts 461a and 461b through the intermediate gear 45'. Further, in the driving force transmission mechanism, the rack member 8' is provided with a pair of outer side portions which face opposite directions and are extended in parallel to each other. The first rack part 47' is formed in one of a pair of the outer side portions and the second rack part 48' is formed in the other of a pair of the outer side portions. The first rack part 47' is capable of engaging with the teeth part 463a of the first tooth-missing gear 46a and the second rack part 48' is capable of engaging with the teeth part 463b of the second tooth-missing gear 46b. Further, the rack members 47' and 48' are formed at positions that are shifted in the driving direction of the rack member 8' (longitudinal direction of the rack member 8').

Therefore, when the motor rotates in one direction and the intermediate gear 45' rotates in a direction shown by the arrow "CW", both two tooth-missing gears 46a and 46b are turned in a direction shown by the arrow "CCW" and, when the first rack part 47' and the teeth part 463a of the first tooth-missing gear 46a are engaged with each other, the rack member 8' is driven in a "T2" direction. In this case, the second rack part 48' is in a non-engagement state with the teeth part 463b of the second tooth-missing gear 46b. Next, when the motor further rotates in one direction and the intermediate gear 45' rotates in the direction shown by the arrow "CW", both two tooth-missing gears 46a and 46b are turned in the direction shown by the arrow "CCW" and, when the second rack part 48' and the teeth part 463b of the second tooth-missing gear 46b are engaged with each other, the rack member 8' is driven in a "T1" direction. In this case, the first rack part 47' is in a non-engagement state with the teeth part 463a of the first tooth-missing gear 46a.

Further, in the rack member 8 of the driving force transmission mechanism 3 in accordance with the embodiment described with reference to FIG. 1 through FIG. 5, the connecting part 49 is located on one end portion and the output part 85 is protruded from the other end portion of the rack member 8'. However, as shown in a driving force transmission mechanism 3' in FIG. 7, an output part 85' may be structured so as to be protruded from an end portion of the rack member 8' on the side where a connecting part 49' is located.

Further, in the embodiment described above, the small AC synchronous motor 2 which rotates in one direction is used as a motor. However, other motors which rotate in one direction or motors capable of rotating in both directions such as a DC motor and a stepping motor may be utilized. Further, the turning direction of the tooth-missing gear 46 is not limited to the "CCW" direction and the tooth-missing gear 46 may be turned in the "CW" direction.

In addition, in the embodiment described above, the open position of the baffle 7 is structured so as to be substantially parallel to the frame 4. However, the present invention is not limited to this embodiment and the open position of the baffle 7 may be set in an inclined position.

In addition, in the embodiment described above, the frame 4 of the motor type damper device 1 is formed in a duct shape. However, the present invention may be applied to other types of a damper device. Further, except a refrigerator, the present invention may be applied to various opening/closing devices for controlling other fluid such as a duct for ventilation and a drain valve for a washing machine.

Further, the present invention may be applied to an opening/closing device except a damper device, for example, other motor type opening/closing devices such as a motor type opening/closing device for driving a louver of an air-conditioner.

INDUSTRIAL APPLICABILITY

In a motor actuator in accordance with the present invention, a gear in the driving force transmission mechanism rotates in one direction and, when the tooth-missing gear part engages with a first rack part of a rack member, the rack member is moved in one direction and, when the tooth-missing gear part engages with the second rack part of the rack member, the rack member is moved in the other direction. As described above, even when a driven member is operated in both directions, it is only required that the gear is rotated in one direction and rotation of a motor is not required to be reversed, and thus the control circuit for the motor actuator can be simplified.

While the preferred embodiments of the present invention have been described using specific terms, such description is for illustrative purposes only, and it is to be understood that changes and variations may be made without departing from the spirit or scope of the appended claims. The presently disclosed embodiments are therefore to be considered in all respects as illustrative and not restrictive, and all changes which come within the meaning and range of equivalency of the claims are therefore intended to be embraced therein.

What is claimed is:

1. A motor actuator in which a driving force of a motor is transmitted to a driven member through a driving force transmission mechanism to operate the driven member,
   wherein, the driving force transmission mechanism comprises:
   a gear train part having a gear which is rotationally driven by the motor;
   a tooth-missing gear which is rotationally driven by the gear; and
   a rack member which is linearly driven by the tooth-missing gear to operate the driven member;
   wherein the tooth-missing gear is provided with a gear part formed with teeth around an entire circumference and structured to engage with the gear, and a tooth-missing gear part, and a teeth part is formed at a predetermined position of the tooth-missing part over only a part of the entire circumference in a circumferential direction of the tooth-missing gear, and a side area in the circumferential direction of the teeth part is formed with a move preventing part for preventing movement of the rack member; and
   the rack member is provided with a first rack part, which causes the rack member to move in one direction to a first position when the motor rotates in one direction and the first rack part engages with the teeth part, and a second rack part which causes the rack member to move in the other direction to a second position when the motor rotates in the one direction and the second rack part engages with the teeth part;
   the first rack part and the second rack part are extended in parallel to each other so as to interpose the tooth-missing gear between the first rack part and the second rack part;
   one end portion of the first rack part and one end portion of the second rack part are connected with each other through a connecting part; and
   an other end portion of the first rack part and an other end portion of the second rack part are separated from each other so as to form a separated space between the other end portions of the first rack part and the second rack part;
   the gear is disposed on an opposite side to the connecting part with respect to the tooth-missing gear;
   the gear is engaged with the gear part of the tooth-missing gear through the separated space;
   when the rack member is moved to one of the first position and the second position, the teeth part of the tooth-missing gear part is rotated until the teeth part is separated from the first rack part and the second rack part;
   when the rack member is located at at least one of the first position and the second position, movement of the rack member is prevented by the move preventing part of the tooth-missing gear part;
   the move preventing part of the tooth-missing gear part is formed in a preventing plate part whose outer circumferential edge portion is formed in a circular arc shape,
   the first rack part is formed with two engaging parts which are disposed so as to be separated from each other; and
   when the rack member is located at least one of the first position and the second position, the two engaging parts of the rack member are engaged with the preventing plate part formed in the circular arc shape to prevent the movement of the rack member.

2. The motor actuator according to claim 1, wherein the tooth-missing gear part is in a non-engagement state with the second rack part when the tooth-missing gear part engages with the first rack part and the tooth-missing gear part is in a non-engagement state with the first rack part when the tooth-missing gear part engages with the second rack part.

3. The motor actuator according to claim 1, wherein the rack member is provided with a pair of inner side portions between which the gear is disposed and which are extended in parallel to each other, and the first rack part is formed in one of a pair of the inner side portions and the second rack part is formed in the other of a pair of the inner side portions.

4. An opening/closing device provided with the motor actuator recited in claim 1, wherein the driven member is an opening/closing member whose position is changed between an open position and a close position by the rack member, and when the rack member is located at the first position, the opening/closing member is located at the open position and, when the rack member is located at the second position, the opening/closing member is located at the close position.

5. The motor actuator according to claim 1, wherein the first rack part is formed with a first tooth part, a second tooth part, a third tooth part, and a fourth tooth part in this order, and the first tooth part and the third tooth part are the two engaging parts of the rack member which are engaged with the preventing plate part of the tooth-missing gear part, and a thickness of the second tooth part is formed thinner than thicknesses of the first tooth part, the third tooth part, and the fourth tooth part so that the preventing plate part is capable of overlapping in an axial direction with the second tooth part.

6. An opening/closing device comprising:
   a motor actuator in which a driving force of a motor is transmitted to an opening/closing member whose position is changed between an open position and a close position through a driving force transmission mechanism;
   wherein, the driving force transmission mechanism comprises:
   a gear train part having a gear which is rotationally driven by the motor;
   a tooth-missing gear which is rotationally driven by the gear; and
   a rack member which is linearly driven by the tooth-missing gear to operate the opening/closing member to the open position and the close position;
   wherein the tooth-missing gear is provide with a gear part formed with teeth around an entire circumference and structured to engage with the gear; and a tooth-missing gear part, a teeth part is formed at a predetermined position of the tooth-missing gear part over only a part of the entire circumference in a circumferential direction of the tooth-missing gear, and a side area in the circumferential direction of the teeth part is formed with a move preventing part for preventing movement of the rack member; and
   the rack member is provided with a first rack part, which causes the rack member to move in one direction to the open position when the motor rotates in one direction and the first rack part engages with the teeth part, and a second rack part which causes the rack member to move in the other direction to the close position when the motor rotates in the one direction and the second rack part engages with the teeth part;
   the first rack part and the second rack part are extended in parallel to each other so as to interpose the tooth-missing gear between the first rack part and the second rack part; and
   one end portion of the first rack part and one end portion of the second rack part are connected with each other through a connecting part; and when the rack member is moved to one of the open position and the close position, the teeth part of the tooth-missing gear part is rotated until the teeth part is separated from the first rack part and the second rack part; and when the rack member is located at least at one of the open position and the close position, movement of the rack member is prevented by the move preventing part of the tooth-missing gear part;

the move preventing part of the tooth-missing gear part is formed in a preventing plate part whose outer circumferential edge portion is formed in a circular arc shape; and the first rack part is formed with two engaging parts which are disposed so as to be separated from each other; and when the rack member is located at least one of the open position and the close position, the two engaging parts of the rack member are engaged with the preventing plate part formed in the circular arc shape to prevent the movement of the rack member.

7. The opening/closing device according to claim 6, wherein the tooth-missing gear part is in a non-engagement state with the second rack part when the tooth-missing gear part engages with the first rack part and the tooth-missing gear part is in a non-engagement state with the first rack part when the tooth-missing gear part engages with the second rack part.

8. The opening/closing device according to claim 6, wherein the rack member is provided with a pair of inner side portions between which the gear is disposed and which are extended in parallel to each other, and the first rack part is formed in one of a pair of the inner side portions and the second rack part is formed in the other of a pair of the inner side portions.

9. The opening/closing device according to claim 6, wherein the first rack part is formed with a first tooth part, a second tooth part, a third tooth part and a fourth tooth part in this order, and the first tooth part and the third tooth part are the two engaging parts of the rack member which are engaged with the preventing plate part of the tooth-missing gear part, and a thickness of the second tooth part is formed thinner than thicknesses of the first tooth part, the third tooth part and the fourth tooth part so that the preventing plate part is capable of overlapping in an axial direction with the second tooth part.

* * * * *